(12) United States Patent
Moore et al.

(10) Patent No.: US 8,310,541 B2
(45) Date of Patent: Nov. 13, 2012

(54) SYSTEM AND METHOD FOR MONITORING A PRINTING SYSTEM USING A CAMERA

(75) Inventors: Steven R. Moore, Pittsford, NY (US); Saurabh Prabhat, Webster, NY (US); Ruddy Castillo, Briarwood, NY (US)

(73) Assignee: Xerox Corporation, Norwalk, CT (US)

( * ) Notice: Subject to any disclaimer, the term of this patent is extended or adjusted under 35 U.S.C. 154(b) by 1053 days.

(21) Appl. No.: 11/904,267

(22) Filed: Sep. 26, 2007

(65) Prior Publication Data

US 2009/0079832 A1  Mar. 26, 2009

(51) Int. Cl.
*H04N 7/18* (2006.01)
(52) U.S. Cl. ......... 348/143; 348/88; 348/160; 358/1.15; 358/1.14; 358/1.6
(58) Field of Classification Search .................... 348/88, 348/160, 143; 358/1.15, 1.14, 1.6
See application file for complete search history.

(56) References Cited

U.S. PATENT DOCUMENTS

| | | | |
|---|---|---|---|
| 4,124,290 A | 11/1978 | Axelrod et al. | |
| 5,239,376 A | 8/1993 | Dittmann | |
| 5,554,480 A | 9/1996 | Patel et al. | |
| 6,002,893 A | 12/1999 | Caruthers et al. | |
| 6,266,159 B1 * | 7/2001 | Otsuka et al. | 358/405 |
| 6,310,637 B1 * | 10/2001 | Shimada et al. | 347/19 |
| 6,351,308 B1 * | 2/2002 | Mestha | 356/402 |
| 6,486,981 B1 * | 11/2002 | Shimura et al. | 358/500 |
| 7,038,833 B1 | 5/2006 | Liu et al. | |
| 7,190,481 B2 * | 3/2007 | Hirabayashi | 358/1.18 |
| 7,193,696 B2 | 3/2007 | Engelbart et al. | |
| 7,202,977 B2 | 4/2007 | Robinson | |
| 7,257,337 B2 | 8/2007 | Amico | |
| 7,339,657 B2 | 3/2008 | Coates | |
| 7,697,850 B2 * | 4/2010 | Mathewson | 399/8 |
| 7,706,700 B2 | 4/2010 | Pan et al. | |
| 7,715,008 B2 * | 5/2010 | Hamby et al. | 356/417 |
| 7,715,733 B2 | 5/2010 | Pan et al. | |
| 8,001,897 B2 * | 8/2011 | Gretsch | 101/477 |
| 2003/0133139 A1 | 7/2003 | Robinson | |
| 2005/0031358 A1 * | 2/2005 | Barrett | 399/9 |
| 2005/0033834 A1 * | 2/2005 | Nutt | 709/223 |

\* cited by examiner

*Primary Examiner* — Quang N Nguyen
*Assistant Examiner* — Hitesh Patel
(74) *Attorney, Agent, or Firm* — Ronald E. Prass, Jr.; Prass LLP

(57) ABSTRACT

A monitoring system and method for monitoring a printing system includes a printing system module and a camera. The printing system module is configured to interface with a primary printing-medium path of the printing system and includes a housing with at least one printing-medium path disposed therein. The at least one printing-medium path is a sub-printing-medium path of the primary printing-medium path. The camera is positioned to capture at least one frame of the inside of the printing system module and can be disposed therein.

12 Claims, 3 Drawing Sheets

SYSTEM AND METHOD FOR MONITORING A PRINTING SYSTEM USING A CAMERA

BACKGROUND

1. Technical Field

The present disclosure relates to the monitoring of printing systems, and, in particular, to a system and method for monitoring a printing system using a camera.

2. Description of Related Art

Many modern production printing systems have multiple printing system "modules". These printing system modules are designed to be easily installed and removed without significant printing system downtime or reconfiguration. This modularity enables the user to easily upgrade or customize the printing system based upon needs and/or market conditions.

Generally, a printing system has one or more primary printing-medium paths that move about the printing media to be printed on (e.g., paper, cardboard, transparencies or the like). The material of a printing-media is sometimes cut into sheets (of rectangular shape) from paper, plastic or other physical print media substrate, and are cut to a suitable shape and size to facilitate the printing system to move the sheet approximately along the general direction of a primary printing-medium path.

Normally a user submits one or more print jobs to the printing system that includes instructions to use one or more sheets of a particular size and shape to form multiple finished products. This can be done by using a printing system terminal, a printing system user interface, and/or a personal computer (with or without a network, such as the internet). Once a job is submitted the various printing system modules coordinate together to ensure that a good quality finished product results.

Because of the ease of reconfiguration of the printing system modules, jobs can be printed "on demand" and "just in time" while reducing costs, worker-hours, and other inefficiencies. Books, catalogs, brochures, direct mailings, inserts, point of purchase materials, sell sheets, statements, financial reports, and flyers with brilliant graphic arts quality are all easily manufactured. Additionally, multiple stocks can be provided by the printing system modules and may be mixed within a grouping of jobs (or within one job) and can take advantage of inline or offline finishing.

For example, a feeder module (e.g., a module with a primary function of adding printing-media to the primary printing medium path) can supply the printing system with adequate printing media to form the pages of a book. Another feeder may supply the primary printing-medium with an insert sheet (e.g., a bookmark). The two differing sheets may be printed on while another printing system module assembles them into a book with the bookmark inserted therein. Because of the wide variety of printing system modules available, a limitless variety of finished products are possible.

Some of the types of printing system modules available for use include: feeder modules, interposer modules, decurler modules, rotator modules, stacker modules, finisher modules, print engine modules, and interface transport modules.

Feeder modules add printing-media to the printing-medium path (e.g., as sheets) as well do interposer modules, however, interposer modules generally add a sheet that was pre-printed or pre-finished elsewhere. Decurler modules mitigate the "curl" that a printing medium can develop during processing. A rotator module rotates a printing medium, and a stacker module forms a stack formation using printing media (e.g., stack of sheets). A finisher module can form stack formations as well, however, finisher modules usually additionally include post printing devices such as sorters, mailboxes, folders, staplers, hole punchers, collaters, stitchers, binders, envelope stuffers, postage machines or the like. The print engine module marks the printing medium with inks and/or toners (such as with CMYK color separations).

SUMMARY

The present disclosure relates to the monitoring of printing systems, and, in particular, to a system and method for monitoring a printing system using a camera.

In an aspect of the present disclosure, a monitoring system for monitoring a printing system includes a printing system module and a camera. The printing system module interfaces with the primary printing-medium path of the printing system and also has one or more printing-medium paths within the housing of the printing system module. At least one of the printing-medium paths is a sub-printing-medium path of the primary printing-medium path. The camera is positioned to capture one or more frames and at least one frame of the inside of the printing system module. The camera may be wholly or partially positioned within the printing system module, attached to the printing system module, or have a fiber optic line to the printing system module (e.g., a fiber optic camera). The printing system module referred to herein can be a feeder module, an interposer module, a decurler module, a rotator module, a stacker module, a finisher module, a print engine module, an interface transport module, or the like.

In another aspect of the present disclosure, the camera can be a CCD camera, a CMOS camera, a video camera, a still camera, an analog camera, or a digital camera, and may have the capability to communicate frames wirelessly. The camera may communicate at least one frame via a Local Area Network or the monitoring system can include a web server operatively connected to any network (e.g., the internet). The web server provides at least one frame to a user using an http interface, a https interface, a ftp interface, a webpage interface, a TCP/IP interface, an Asynchronous Transfer Mode interface, and/or an internet interface. Additionally or alternatively, the camera may communicate at least one frame using the TCP/IP set of protocols without using a web server.

In another aspect of the present disclosure, the monitoring system can include a camera interface module which communicates with the camera to retrieve at least one frame. The camera interface module may be implemented by instructions (e.g., assembly, code, bytecode or the like) and may be installable in a printing system user interface, a personal computer, and/or a user terminal.

In another aspect of the present disclosure the camera can be positioned to facilitate determining a toner level, an ink level, a lubricator level, and/or a waste level. The camera can also be positioned so that the image taken by the camera is of a high probability jam region of a printing-medium path. The printing system module can have a stack formation formed from sheets, and the camera can be positioned so that at least one frame is an image of the stack formation. Some types of printing system modules that include stack formations are stacker modules, feeder modules, or finisher modules. The camera's field of view of the stack formation may be a side view or a top view. A frame that includes an image of a stack formation may be utilized by an image-processing component. The image-processing component is configured to process the at least one frame of the stack formation and is in operative communication with the camera. The image-processing component can detect sheet misregistration errors and/or curl errors. The image processing component can also implement a compensating algorithm to determine adjustment parameter of the printing system that can be used in compensating for the detected errors.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
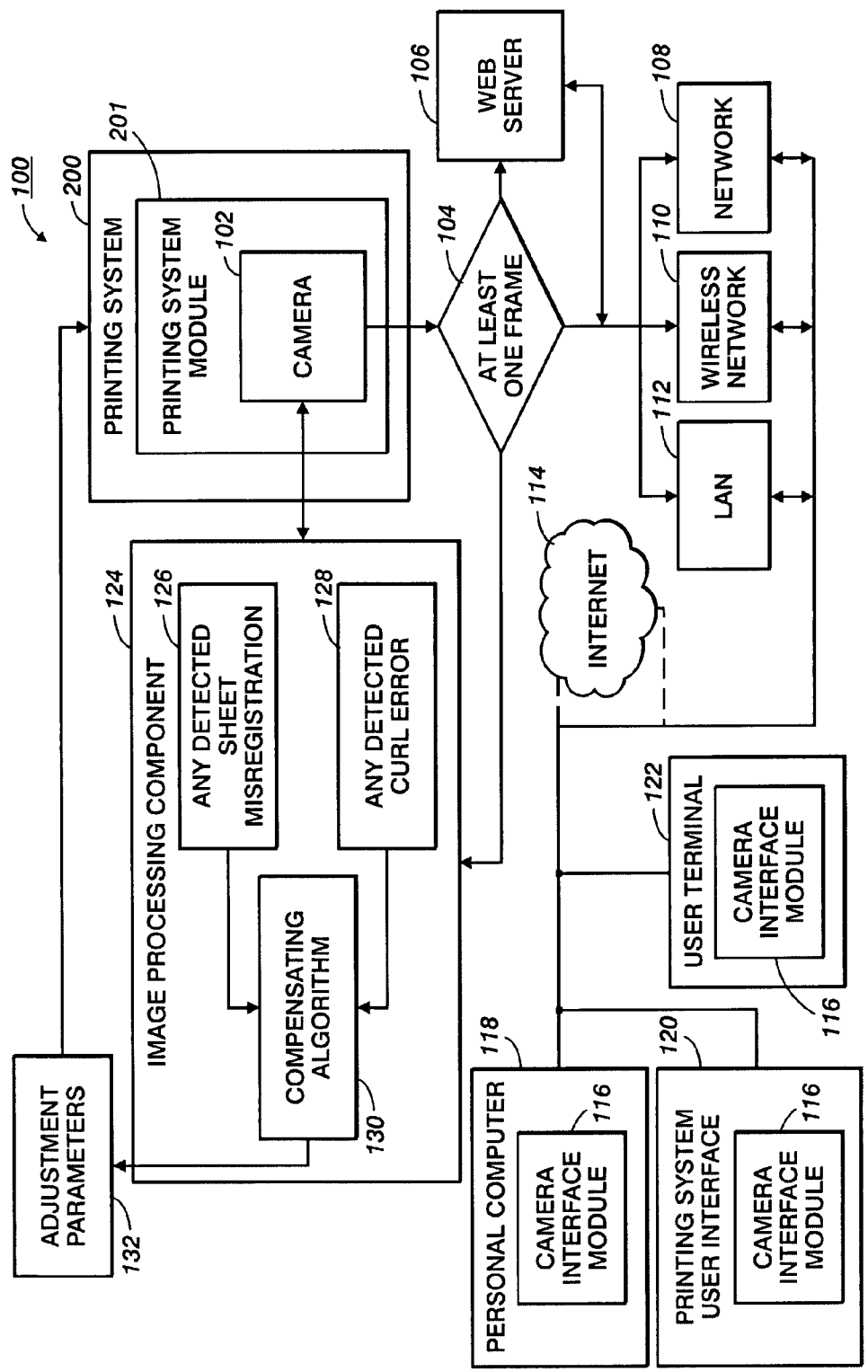
FIG. 1 is a block diagram of a monitoring system for monitoring a printing system in accordance with the present disclosure.
Figure 2:
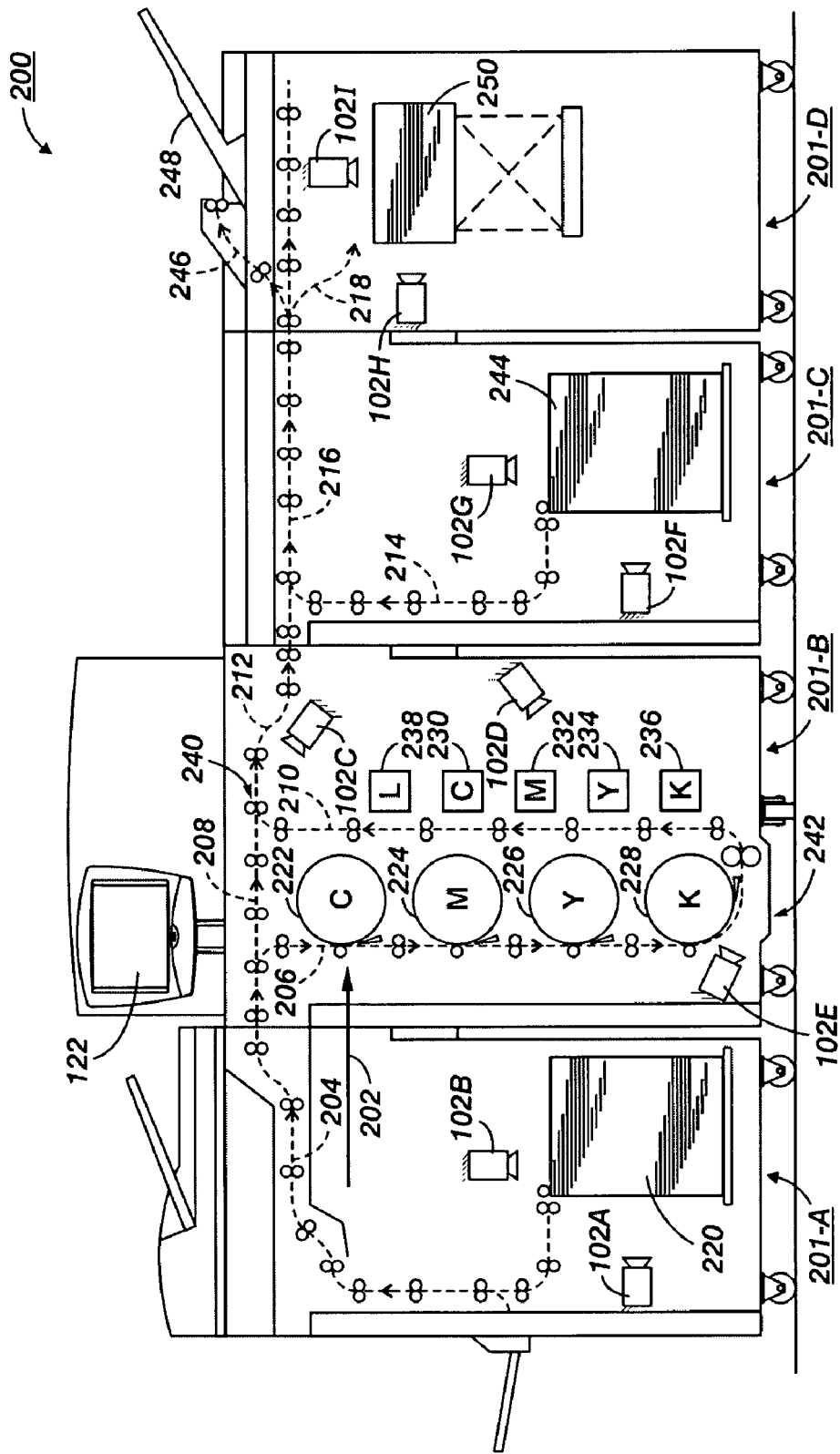
FIG. 2 is a diagram of a printing system showing exemplary placements of the camera of FIG. 1 in accordance with the present disclosure.

Referring simultaneously to FIGS. 1 and 2, monitoring system 100 is shown and is configured for monitoring printing system 200. Note that camera 102 is positioned within printing system module 201 (see FIG. 1); however, such positioning is primarily to illustrate that at least one frame 104 is an image of a view within printing system module 201 (discussed in more detail infra). Camera 102 may be a charged coupled device based camera (herein referred to as "CCD camera"), a complementary metal-oxide-semiconductor based camera (herein referred to as a "CMOS camera"), a video camera, a still camera, an analog camera, a digital camera or the like. Camera 102 may be placed anywhere within printing system module 201, and printing system 200 may have multiple modules.

Printing system module 201 may be a feeder module, an interposer module, a decurler module, a rotator module, a stacker module, a finisher module, a print engine module, an interface transport module, or the like, such as printing system modules 201-A, 201-B, 201-C, and 201-D which are included in printing system 200 of FIG. 2. Each of printing system modules 201-A through 201-D may be represented as printing system module 201 of FIG. 1. The letter designation of printing system modules 201-A through 201-D is used to indicate that the printing system module is a subtype printing system module while "201" designates any printing system module of any type.

Specifically, printing system module 201-A is a feeder module, printing system module 201-B is a print engine module, printing system module 201-C is a interposer module, and printing system module 201-D is a stacker module. Printing system modules 201-A through 201-D together make up printing system 200 of FIG. 2 with a primary printing-medium path 202 that illustrates the general direction the printing-media travels (e.g., general sheet direction) and FIG. 2 also illustrates the modular design of many "production" printing systems available today, i.e., high volume printing systems. Each printing system module of FIG. 2 includes at least one printing-medium path disposed within the printing system module. Each printing-medium path is a sub-printing medium path of the primary printing-medium path 202.

Printing-medium path 204 is within printing system module 201-A, printing-medium paths 206 through 212 are within printing system module 201-B, printing-medium paths 214 and 216 are within printing system module 201-C, and printing-medium paths 218 and 246 are within printing system module 201-D. It is to be appreciated that printing system 200 is only a simplified diagram of printing system 200 intended to illustrate some embodiments according to the present disclosure.

Referring again to FIG. 1, camera 102 provides a wealth of information to a user with even a simple image (provided by at least one frame 104) of a piece of machinery, a component, and/or a printing-medium path of printing system module 201. Many mechanical problems can be easily diagnosed by viewing an image of the suspect item. In some instances, a simple image provides more pertinent information than other commonly used non-imagining sensors. Generally, a designer of a printing system must have sufficient foresight to anticipate what kinds of problems a non-imagining sensor can detect, what kind of non-imagining sensor to use, where should the non-imagining sensor be placed, and how to interpret the non-imagining sensor data to properly utilize the non-imagining sensor to diagnosis or monitor printing system 200. Although non-imagining sensors can be an indispensable tool in many situations, these sensors may not detect all problems or malfunctions, especially the unanticipated kind. Thus, a camera may have advantages in determining the source of the problem and/or to find a solution to the problem by giving a user or image processing component (discussed infra) access to at least one frame 104.

For example, typically a printing-medium path uses rollers and guides to move sheets of printing medium along a printing-medium path, however, repeated jams may occur due to excessive electrostatic charge buildup on a guide. When printing system 200 is shut down and inspected by a technician reviewing the jammed region, the source of the jams may not be apparent to the technician, making the diagnosis of the problem more difficult. By using a properly positioned camera (e.g., camera 102) the influence of the charge buildup upon sheets can be easily seen by viewing video (at least one frame 104 may be part of a series of frames constituting video data or a video signal) making the source of the jams more easily determinable.

Specifically, camera 102 can take at least one frame 104 from several possible positions within printing system 200 as illustrated by the various embodiments represented by cameras 102A through 102I of FIG. 2. At least one frame 104 can be taken from one of cameras 102A through 102I from the inside of one of the printing system modules 201-A through 201-D. The positioning of camera 102 is used to capture the at least one frame 104 to provide a user with visual information and/or to provide an image-processing component with an image for processing.

Referring now to only FIG. 1, camera 102 can take at least one frame 104 and communicate it using web server 106, network 108, wireless network 110, LAN 112 or the like. At least one frame 104 can be communicated in digital or analog form, and camera 102 includes sufficient hardware, software, and/or firmware to communicate the at least one frame 104. For example, web server 106 may be connected to network 108 (e.g., a Ethernet network) and communicates over the internet 114 using a http interface, a https interface, a ftp interface, a webpage interface, a TCP/IP interface, and/or a Asynchronous Transfer Mode interface. Web server 106 may include a mechanism for a user to access at least one frame 104 from any web browser connected to internet 114. Additionally or alternatively, camera 102 may communicate the at least one frame 104 directly using TCP/IP and/or a Local Area Network (referred to herein as a "LAN").

Monitoring system 100 includes camera interface module 116 that can be implemented in hardware, software, firmware, or a combination thereof. Camera interface module 116 may provide a GUI interface and/or some other user interface to access camera 102 and view the at least one frame 104. Access may be made by camera interface module 116 using LAN 112, Wireless network 120, network 108, via internet 114, a direct connection, or other communication technology. Camera interface module 116 may be a software package implemented on personal computer 118 and/or part of a software package such as a software package "add-on" in personal computer 118, printing system user interface 120, and/or user terminal 122 (shown in FIGS. 1 and 2).

Consider the following example: a user may use a computer connected to the internet to open a web browser program from anywhere in the world. When the proper URL is typed into the web browser, the web browser, if properly configured, communicates with web server 106 and data is communicated with the web browser software enabling the user to view the images of camera 102. It is to be appreciated that web server 106 can use any technology to communicate the at least one frame 104 (either as a still image and/or as video) such as HTML, XML, Java, PHP and the like. Note that a web browser is not depicted; however web browsers are well known.

Consider another example: note that user terminal 122 is depicted in FIGS. 1 and 2 and has camera interface module 116 installed therein, giving a person direct access to the at least one frame 104 "onsite". This may be useful when trying to make onsite repairs and/or adjustments. Printing system user interface 120 may be similar to user terminal 122, but in an exemplary embodiment, includes a touch screen monitor e.g., making it an industrial control computer, includes PDA-type devices, or the like. Personal computer 118 may include one or more software packages, such as job flow software, job editing software, control software and/or other types of software used in conjunction with and/or to control printing system 200. As mentioned above, camera interface module 116 may be an add-on software package that is installable in another software package. For example, an overall control software package may be included with printing system 200; however, for various reasons the overall control software may have several optional "modules" that can be installed and/or removed at will. Camera interface module 116 may be this type of installable software.

Referring to the drawings, FIG. 2 is an illustration depicting some advantages of various exemplary placements of camera 102 as indicated by cameras 102A through 102B. Initially, note the positioning of camera 102A. Camera 102A is positioned to have a field of view that is a side view of stack formation 220. Stack formation 220 may be formed from a stack of printing-media (e.g., a stack of sheets of paper). Printing system module 201-A includes stack formation 220 because it is a feeder module. Printing system module 201-A is used to add printing media to primary printing-medium path 202. For example, stack formation 220 provides one or more sheets of printing media to primary printing-medium path 202 from stack formation 220. It is moved along printing medium path 204 to printing system module 201-B. Note that printing medium path 204 is operatively connected to printing-medium path 206 of printing system module 201-B. This allows printing system module 201-A to "feed" printing media into the primary printing-medium path 202, thus giving rise to the name of "feeder module".

Therefore, the condition of stack formation 220 can be advantageously examined by a camera, e.g., such as by positioning camera 102A to have a field of view that is a "side view" of stack formation 220. Stack formation 220 may have certain errors that are easily determined by viewing at least one frame 104 (see FIG. 1). For example, stack formation 220 can have one or more sheets that are starting to curl, which are readily identifiable by viewing an image taken from using camera 102A. Additionally or alternatively, the "feeding" of printing-medium of stack formation 220 to printing-medium path 204 may be easily examined by using camera 102A. Because many printing systems (e.g., printing system 200) rely on the rapid production of documents (e.g., books, newspapers, newsletters, etc.) it may be important to ensure that printing media is being properly fed into the system (e.g., proper feeding of printing-media into primary printing-medium path 202). Misregistration of sheets within stack formation 220 is detectable by camera 102A. For example, if a grouping of 10 sheets where shifted to the "left or right" from the perspective of camera 102A, that shift may be visible within the field of view of camera 102A. Also, other printing medium defects or errors can also be detected by camera 102A, such as wrong color errors, wrong stock errors, tears, gouges, twisting of the printing media, or the like.

Referring again to printing system module 201-A, note the position of camera 102B. Camera 102B is positioned to have a "top view" of stack formation 220. Camera 102B can also view the feeding of printing-media from stack formation 220 as its being fed into primary printing-medium path 202. Camera 102B also has a field of view of the entire printing media of stack formation 220 from the top. This enables camera 102B to detect other kinds of errors in addition to some of the errors that camera 102A may detect. For example, misregistration of sheets within stack formation 220 along two axes may be seen from the top view. Additionally, camera 102B may transmit real time video enabling the viewing of the printing-media as it is loaded, assisting in the detection of tears, misalignment, twisting, or other errors that can be seen by viewing the feeding machinery.

Referring now to FIG. 2, and specifically, to printing system modules 201-A and 201-B of printing system 200, note that printing-medium path 204 of printing system module 201-A is connected to printing-medium path 206 of printing system module 201-B ensuring continuity of primary printing-medium path 202. Printing system module 201-B is a print engine module and includes CMYK (cyan, magenta, yellow, and black) color separations, specifically, color separations 222, 224, 226, and 228, each mark the cyan, magenta, yellow, and black colors, respectively. Reservoirs 230, 232, 234, and 236, hold either ink or toner for the cyan, magenta, yellow, or black materials, respectively. Also, lubrication is held in reservoir 238. Cameras 102C, 102D, and 102E are positioned within printing system module 201-B.

Consider the following example: consider that a piece of printing medium, such as a sheet, may travel from stack formation 220 via printing medium path 204 and from system printing module 201 to printing system module 201-B, thus in aggregate, travels along primary printing-medium path 202. The sheet can travel along printing-medium path 206 to be marked upon, or alternatively, can travel along printing-medium path 208 following a bypass route. Printing-medium paths 206 and 208 merge to form printing-medium path 212. But, as the sheet travels along printing-medium path 206 it is marked by color separation 222 with cyan toner from reservoir 230, by color separation 224 with magenta toner from reservoir 232, by color separation 226 with yellow toner from reservoir 234, and by color separation 228 with black toner from reservoir 236. After marking, the fully marked sheet travels "upward" as seen from FIG. 2, to travel along printing-medium path 212 after passing through high probability jam region 240 and continues to travel along primary printing-medium path 202 to printing system module 201-C. Some of the rollers associated with fixing or fusing of color separations 230-236 may be lubricated by using lubrication from reservoir 238.

Color separations 222-228 all can mark a sheet with small dots or lines forming what is generally referred to as halftone patterns. The various halftone patterns can form a wide variety of colors for visual perception beyond the individual colors of color separations 222-228. Because printing system module 201-B is a print engine module, an important function is performed therein. To support this function, user terminal 122 is positioned on or near printing system module 201-B; although, access may also be gained via another computer and/or over the internet.

Within printing system module 201-B, cameras 102C, 102D, and 102E are depicted. Camera 102C is positioned to view high probability jam area 240. Camera 102C is so positioned to facilitate the capture of a frame showing any abnormal and/or aberrant operation of the machinery and the rollers within high probability jam region 240, thus allowing a user to tweak and/or adjust parameters to prevent jamming as much as practicable.

Additionally or alternatively, camera 102D is positioned within printing system module 201-B so that the at least one frame 104 of FIG. 1 includes an image of at least one level indicator of reservoirs 230 through 238. For example, reservoir 238 may have a visual level indicator such as a clear tube with tally marks that can be used to determine the lubricator level of reservoir 238. Although, each of the reservoirs may include one or more level sensors, sometimes these sensors give improper readings and/or malfunction. Therefore, by positioning camera 102D to capture at least one frame, the image produced (such as at least one frame 104) may provide an additional way of determining the fluid (or toner) levels. Additionally or alternatively, leaks, spillage, damage, or the like of reservoirs 230-238, may also be determined by using camera 102D.

Now refer to camera 102E and note the position as pointing at waste region 242. Because of inefficiencies in color separations 222-228, some excess toner and/or ink is transported and can accumulated within waste region 242. Also, various tubes and/or hosing can leak, e.g., the path that the lubricator liquid of reservoir 238 travels along while going to various parts of the machinery within printing system 200 may leak. Because of these marking inefficiencies, and other reasons, a significant amount of materials and liquids can accumulate within printing system 200. Therefore, a container and/or another type of area may be designed within printing system module 201-B (e.g., waste region 242) to prevent the waste from interfering with the operation of printing system 200, and also to ensure that the final product is not contaminated. This region needs to be periodically cleaned and the waste therein removed.

However, it is inefficient to stop operation of printing system 200 more often than necessary because the average output per hour is highly correlated to profitability of operating printing system 200. For this reason and other reasons, camera 102E can be positioned to view the accumulation of the liquids to assist in preventing unnecessary stoppages. Additionally or alternatively, the type of accumulated material present can also be determined by using camera 102E. For example, by using proper kinds of lighting with sufficient wavelengths, the types of liquid contained within waste 242 may be determined. For example, a hydraulic fluid may be used within printing system 200 and may include an added fluorescent dye. Because it may be necessary to prevent all or almost all of the hydraulic fluid from leaking from any tubes and reservoirs within printing system 200, a florescent light may be used to illuminate waste region 242. If any of the hydraulic fluid is leaking and settling within waste region 242, camera 102E can take an image showing the presence of the hydraulic fluid because the fluorescent dye is producing the appropriate color visible within the at least one frame 104 of FIG. 1.

Referring now to printing system module 201-C, note that printing-medium path 212 of printing system module 201-B is connected to printing-medium path 216 of printing system module 201-C, thus ensuring continuity of production along primary printing-medium path 202 of printing system 200. Printing-medium path 216 can move the printing-media to printing system module 201-D or can inject an additional piece of printing-medium (e.g., a sheet) from stack formation 244 along printing-medium path 214. For example, consider that stack formation 220 can include paper sheets used to form the pages of a book and that in the middle of the book, printing system module 201-C can inject a bookmark from stack formation 244 after a particular page of the book passes via printing-medium path 216. The bookmark can pass to printing system module 201-D and then another sheet may enter into printing system module 201-C from printing system module 201-B along printing-medium path 216 forming the next appropriate page of the book. Thus, effectively a bookmark has been interposed, and hence the name "interposer module".

Note that camera 102F is positioned such that it has a field of view that is a side view of stack formation 244. Similarly to camera 102A regarding stack formation 220, camera 102F has a field of view that is a side view of stack formation 244. Camera 102F can detect certain misregistrations. Additionally or alternatively, camera 102F can determine if the printing-medium is properly being fed into printing medium path 214. Camera 102F is positioned to detect curls, tears, twisting and other errors that may occur regarding stack formation 244.

Camera 102G is positioned to have a top view of stack formation 244. Camera 102G can detect many of the same errors and similar information as camera 102B can detect and gather. For example, camera 102G can take one or more frames forming a video of the sheets as they move from stack formation 244 along printing-medium path 214. Note that printing-medium paths 214 and 216 form a route to printing system module 201-D via printing-medium path 218. Printing system module 201-D is a finisher module and performs varying finishing functions to the printing media, e.g., hole punching, stapling or the like.

Printing-medium path 218 routes the printing media (e.g., sheets) for stacking to form stack 250. Note that camera 102H is positioned to have a side view enabling certain types of errors and/or problems to be noticed within at least one frame 104 (see Fig.) similarly to that of cameras 102A and 102F. Also, camera 102I can serve many of the basic functions of camera 102B and 102G. Additionally or alternatively, camera 102I can also take an image of stack formation 250 and view the printing medium as they are being stacked. This gives camera 102I the advantage of viewing the sheets to determine if the finishing process is properly modifying the sheets. For example, camera 102I can determine if the sheets are being stapled into groups.

Printing system module 201-D also includes sample extractor 248 designed to route a sample from printing-medium path 216 via printing-medium path 246 and then finally to sample extractor 248 for viewing. Sample extractor 248 may be used so that a user can obtain a sample of a printed medium to determine if any unwanted visual artifacts appear.

Referring simultaneously to FIGS. 1 and 2, although a user can view the at least one frame 104, additionally or alternatively, at least one frame 104 may be processed by image processing component 124. Image processing component 124 may use at least one frame 104 taken from one of cameras 102A through 102I and apply an image processing algorithm to detect various kinds of errors. For example, image processing component may detect a sheet misregistration or curl error of stack formations 220, 224, and/or 250, with cameras 102A and 102B, cameras 102G and 102F, and cameras 102I and 102H, respectively. Any detected sheet misregistration 126 (e.g., a sheet misregistration detected by camera 102A) and/or any detected curl error 128 may be used by compensating algorithm 130 to generate adjustment parameters 132. Adjustment parameters can be used to correct the detected errors (e.g., by using a decurler) and/or is used to prevent such errors from occurring in the future. Adjustment parameters 132 are applied to printing system 200.

Figure 3:
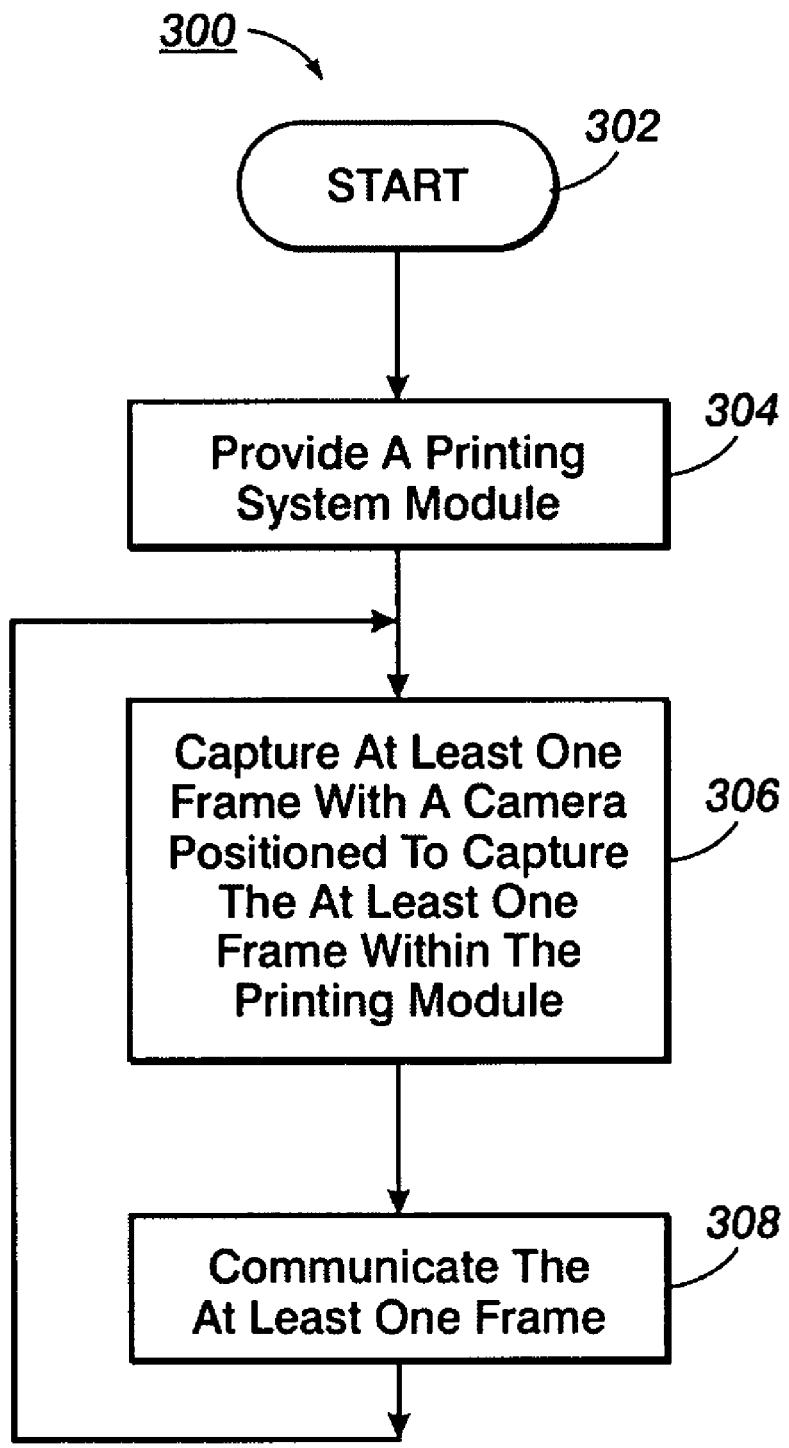
FIG. 3 is a flow chart diagram illustrating a method for monitoring a printing system in accordance with the present disclosure.

Referring to the drawings, FIG. 3 illustrates a flow chart diagram of a method 300 for monitoring a printing system. Method 300 begins at start 302 and can provide a printing system module of step 304. The printing system module of step 304 may be printing system modules 201-A through 201-D of FIG. 2, printing system module 201 of FIG. 1, a feeder module, an interposer module, a decurler module, a rotator module, a stacker module, a finisher module, a print engine module, an interface transport module, or the like.

Method 300 also includes step 306 that can capture at least one frame with a camera positioned to capture the at least one frame of the inside of the printing system module (of Step 302). The camera mentioned can be camera 201 of FIG. 1, cameras 102A through 102I of FIG. 2, a CCD camera, a CMOS camera, a video camera, a still camera, an analog camera, a digital camera, or the like. Method 300 can communicate the at least one frame 308. The at least one frame of steps 306 and 308 can be at least one frame 104 of FIG. 1. Step 308 may use camera interface module 120 of FIG. 1 within personal computer 118, printing system user interface 120, or user terminal 122 (as shown in either FIG. 1 or 2). Additionally or alternatively, step 308 may communicate the at least one frame using internet 114, LAN 112, Wireless network 110, network 108, web server 106, or the like.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A monitoring system for monitoring a printing system, comprising:
   a printing system module configured to interface with a primary printing-medium path of the printing system, wherein the printing system module includes a housing with at least one printing-medium path disposed therein, wherein the at least one printing-medium path is a sub-printing medium path of the primary printing-medium path;
   a first camera positioned to capture a first frame of the inside of the printing system module structure, the first frame displaying in real time an image of a side view of a print medium stack of the printing system module structure;
   a second camera positioned to capture a second frame of the inside of the printing system module structure, the second frame displaying in real time an image of a top view of the print medium stack;
   a third camera positioned to capture a third frame of the inside of the printing system module structure, the third frame displaying in real time an image of a liquid contained in a waste region, the liquid being illuminated by lighting having sufficient wavelengths to allow determination of the type of the liquid; and
   an image-processing component,
   wherein the first camera is positioned to determine whether a sheet of print medium in the print medium stack is curled or flat,
   the second camera is positioned to determine whether a sheet of print medium in the print medium stack is misregistered in the print medium stack, and
   the image-processing component reads the first frame and the second frame and determines adjustment parameters of the printing system to compensate for the detected curl and/or misregistration.

2. The monitoring system according to claim 1, wherein the first camera and the second camera are disposed within the housing of the printing system module.

3. The monitoring system according to claim 1, wherein the first camera and the second camera are each one of a CCD camera, a CMOS camera, a video camera, a still camera, an analog camera, and a digital camera.

4. The monitoring system according to claim 1, wherein the first camera and/or the second camera communicate at least one of the first frame and the second frame wirelessly.

5. The monitoring system according to claim 1, wherein the first camera and/or the second camera communicate at least one of the first frame and the second frame via a Local Area Network.

6. The monitoring system according to claim 1, wherein the monitoring system further comprises:
   a web server operatively connected to a network, wherein the web server provides at least one of the first frame and the second frame to a user using at least one of a http interface, a https interface, a ftp interface, a webpage interface, a TCP/IP interface, an Asynchronous Transfer Mode interface, and an internet interface.

7. The monitoring system according to claim 1, wherein the monitoring system further comprises:
   a camera interface module that operatively communicates with the first camera and the second camera to communicate at least one of the first frame and the second frame.

8. The monitoring system according to claim 7, wherein the camera interface module is installable in at least one of a printing system user interface, a personal computer, and a user terminal.

9. A method for monitoring a printing system, comprising:
   providing a printing system module having a structure and that interfaces with a primary printing-medium path of the printing system, wherein the printing system module includes a housing with at least one printing-medium path disposed therein, wherein the at least one printing-medium path is a sub-printing-medium path of the primary printing-medium path;
   capturing a first frame of the inside of the printing system module structure using a first camera, the first frame displaying in real time an image of a side view of a print medium stack of the printing system module structure;
   capturing a second frame of the inside of the printing system module structure using a second camera, the second frame displaying in real time an image of a top view of the print medium stack;

capturing a third frame of the inside of the printing system module structure, the third frame displaying in real time an image of a liquid contained in a waste region, the liquid being illuminated by lighting having sufficient wavelengths to allow determination of the type of the liquid; and processing the first frame and the second frame with an image processing component, wherein the first camera is positioned to determine whether a sheet of print medium in the print medium stack is curled or flat, the second camera is positioned to determine whether a sheet of print medium in the print medium stack is misregistered in the print medium stack, and the image-processing component reads the first frame and the second frame and determines adjustment parameters of the printing system to compensate for the detected curl or misregistration.

10. A monitoring system for monitoring a printing system, the monitoring system comprising:

a first camera that captures a first frame of the inside of a structure of a printing system module, the first frame displaying in real time an image of a side view of a print medium stack of the printing system module structure;

a second camera that captures a second frame of the inside of the structure of the printing system module, the second frame displaying in real time an image of a top view of the print medium stack;

a third camera that captures a third frame of the inside of the printing system module structure, the third frame displaying in real time an image of a liquid contained in a waste region, the liquid being illuminated by lighting having sufficient wavelengths to allow determination of the type of the liquid; and a processor that processes the image, wherein the first camera is positioned to determine whether a sheet of the print medium in the print medium stack is curled or flat, the second camera is positioned to determine whether a sheet of the print medium in the print medium stack is misregistered in the print medium stack, and the processor reads the first frame and the second frame and determines adjustment parameters of the printing system to compensate for the detected curl and/or misregistration.

11. The monitoring system according to claim 10, wherein the monitoring system further comprises:

a transmitter that transmits the first frame and the second frame to a remote location.

12. The monitoring system according to claim 11, wherein the transmitter is a wireless transmitter.

* * * * *